United States Patent
Wang et al.

(10) Patent No.: US 9,656,666 B2
(45) Date of Patent: May 23, 2017

(54) METHODS AND SYSTEMS FOR STARTING AN ENGINE

(71) Applicant: Ford Global Technologies, LLC, Dearborn, MI (US)

(72) Inventors: Xiaoyong Wang, Novi, MI (US); Mark Steven Yamazaki, Canton, MI (US); Jeffrey Allen Doering, Canton, MI (US); Wei Liang, Farmington Hills, MI (US); Rajit Johri, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 14/472,222

(22) Filed: Aug. 28, 2014

(65) Prior Publication Data

US 2016/0059846 A1    Mar. 3, 2016

(51) Int. Cl.
| | |
|---|---|
| *B60W 20/00* | (2016.01) |
| *F02N 11/08* | (2006.01) |
| *F02N 11/04* | (2006.01) |
| *B60W 10/08* | (2006.01) |
| *B60W 10/06* | (2006.01) |
| *B60W 10/02* | (2006.01) |

(Continued)

(52) U.S. Cl.
CPC ............ *B60W 20/40* (2013.01); *B60W 10/02* (2013.01); *B60W 10/06* (2013.01); *B60W 10/08* (2013.01); *B60W 20/1088* (2013.01); *F02N 11/04* (2013.01); *F02N 11/0814* (2013.01); *F02N 11/0851* (2013.01); *B60W 2510/0638* (2013.01); *B60W 2510/081* (2013.01); *B60W 2540/10* (2013.01); *B60W 2710/027* (2013.01); *B60W 2710/0666* (2013.01); *F02D 41/06* (2013.01); *F02D 2200/101* (2013.01); *F02D 2200/602* (2013.01); *F02D 2250/18* (2013.01); *F02N 2200/022* (2013.01); *F02N 2200/101* (2013.01); *F02P 5/1506* (2013.01); *Y02T 10/48* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 2012/0323418 A1 | 12/2012 | Sah et al. | |
| 2013/0296125 A1* | 11/2013 | Gibson | B60W 20/10 477/5 |
| 2014/0088805 A1 | 3/2014 | Tulpule et al. | |

OTHER PUBLICATIONS

Nedorezov, Felix et al., "Methods and Systems for Applying a Driveline Disconnect Clutch," U.S. Appl. No. 14/447,177, filed Jul. 30, 2014, 32 pages.

* cited by examiner

*Primary Examiner* — Colby M Hansen
(74) *Attorney, Agent, or Firm* — David Kelley; McCoy Russell LLP (57) ABSTRACT

Methods and systems are provided for improving engine restart operations responsive to a heavy operator pedal tip-in. Engine torque and disconnect clutch capacity are controlled during cranking and engine speed run-up so as to provide excess torque to accelerate the engine to the motor speed and prepare the engine for elevated torque delivery after the engine connects to the driveline. At a time of connecting the engine to the driveline, the engine torque is transiently reduced to avert NVH issues related to engine speed overshooting or undershooting the target speed.

19 Claims, 4 Drawing Sheets

(51) Int. Cl.
*F02D 41/06* (2006.01)
*B60W 20/40* (2016.01)
*F02P 5/15* (2006.01)

METHODS AND SYSTEMS FOR STARTING AN ENGINE

FIELD

The present description relates to systems and methods for improved engine speed control during an engine restart. The engine may be selectively coupled to an electrical machine and a transmission in a hybrid electric vehicle.

BACKGROUND AND SUMMARY

Hybrid electric vehicles (HEV's) utilize a combination of an internal combustion engine with an electric motor to provide the power needed to propel a vehicle. This arrangement provides improved fuel economy over a vehicle that has only an internal combustion engine in part due to the engine being shut down during times when the engine operates inefficiently, or is not otherwise needed to propel the vehicle. During these conditions, the vehicle is transitioned from an engine mode to an electric mode where the electric motor is used to provide all of the power needed to propel the vehicle. When the driver demand for power increases such that the electric motor can no longer provide enough power to meet the demand, or if the battery state of charge (SOC) drops below a certain level, the engine is restarted. Vehicle propulsion is then transitioned from an electric mode to an engine mode.

One method of enabling a smooth engine restart in an HEV powertrain is disclosed by Tulpule et al. in US 20140088805. Therein, a disconnect clutch is disposed between an engine and a motor, which is operable to disconnect the engine from the motor. During an engine restart, the disconnect clutch is disengaged so that the engine can be fueled to obtain a speed that matches the motor speed. Then, when the engine speed matches the motor speed, the disconnect clutch is engaged to couple the engine and the motor to the drive shaft to meet the driver torque demand. In another example disclosed by Sah et al. in US 20120323418, engine speed and transmission input speed is synchronized when an oncoming clutch is activated and an outgoing clutch is deactivated.

However the inventors have recognized potential issues with such an approach. If a driver demands torque during the engine starting, it may be challenging to provide sufficient torque (e.g., from the motor) to meet the driver demand as well as start the engine. If motor torque is used to meet the driver demand, engine starting may be delayed, degrading engine acceleration. The engine performance may be particularly slow when the vehicle driver tips in heavily to launch the vehicle from a stationary state. If motor torque is used to start the engine, the driver demand may not be met in a timely manner, degrading the operator's drive experience. In addition, due to the continuous change in motor speed resulting from the variation in operator torque demand, it may be difficult for an engine controller to predict a target synchronous motor speed at which to close the disconnect clutch and enable the transition from electric mode to hybrid mode.

The inventors have recognized these issues and developed a method for a hybrid vehicle with an improved engine restart method. In one example, a driveline method comprises: closing a driveline disconnect clutch to start an engine; and adjusting engine torque after a first combustion event in response to each of accelerator pedal position and speed of a motor. In this way, engine speed can be controlled during an engine run-up based on an accelerator pedal position to expedite engine restart and enable an earlier transition to vehicle propulsion using engine torque.

As an example, while a vehicle is propelled via motor torque from an electric motor, an engine restart request may be received. The engine restart may be requested responsive to a heavy accelerator pedal tip-in by the vehicle operator. Accordingly, the engine may enter a first phase of an engine restart operation wherein the engine is cranked, unfueled, via the electric motor with a disconnect clutch coupled between the engine and motor at least partially open. The torque capacity of the disconnect clutch may be adjusted during the first phase so as to provide sufficient torque to overcome the compression braking torque of the engine and crank the engine. The motor torque may be transiently raised during the cranking so as to provide sufficient torque for engine cranking and concurrent vehicle propulsion. Following cranking, the engine may enter a second phase of the restart operation where engine fueling and cylinder combustion is resumed, and the engine speed is controlled based on the motor speed and the accelerator pedal position to provide the maximum possible torque under the given operating conditions. Herein, the engine speed is controlled to a target synchronous speed that corresponds to a current motor speed, or a predicted motor speed at a time of disconnect clutch engagement. In addition, the engine speed is further controlled based on the accelerator pedal position (or driver torque demand) so as to provide maximal engine torque at the given engine speed to accelerate the engine to the target synchronous speed as rapidly as possible, and to concurrently prepare the engine air path for torque delivery after the engine connects to the driveline. The engine speed is controlled using adjustments to engine fueling, spark timing, and throttle position while the disconnect clutch is maintained partially disconnected. When the engine speed approaches the motor speed (while remaining below it), the engine enters a third phase of the restart operation wherein the disconnect clutch is gradually engaged. Therein, the engine torque is reduced below the disconnect clutch capacity so that the engine can continue to accelerate to the target speed without overshooting the target speed. When the engine speed matches the synchronous speed, the disconnect clutch may be closed and the vehicle may be transitioned into being propelled using engine torque only.

In this way, a quality of engine restarts in a hybrid electric vehicle, such as those performed while an operator is tipping in, may be improved. By controlling the engine speed during a run-up phase of an engine restart based at least on an accelerator pedal position, the engine speed can be raised to a target synchronous speed faster while the engine's air path is better prepared for elevated engine torque delivery following disconnect clutch engagement. By transiently lowering an instantaneous engine torque prior to, and during, disconnect clutch engagement, NVH issues and driveline torque disturbances associated with overshooting (or undershooting) of the target synchronous speed can be reduced. Overall, a faster engine restart and transition into vehicle propulsion using engine torque is enabled, allowed for expedited engine acceleration and vehicle launch.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 3 shows an example method for restarting an engine of a hybrid electric vehicle during a tip-in;

DETAILED DESCRIPTION

Figure 1:
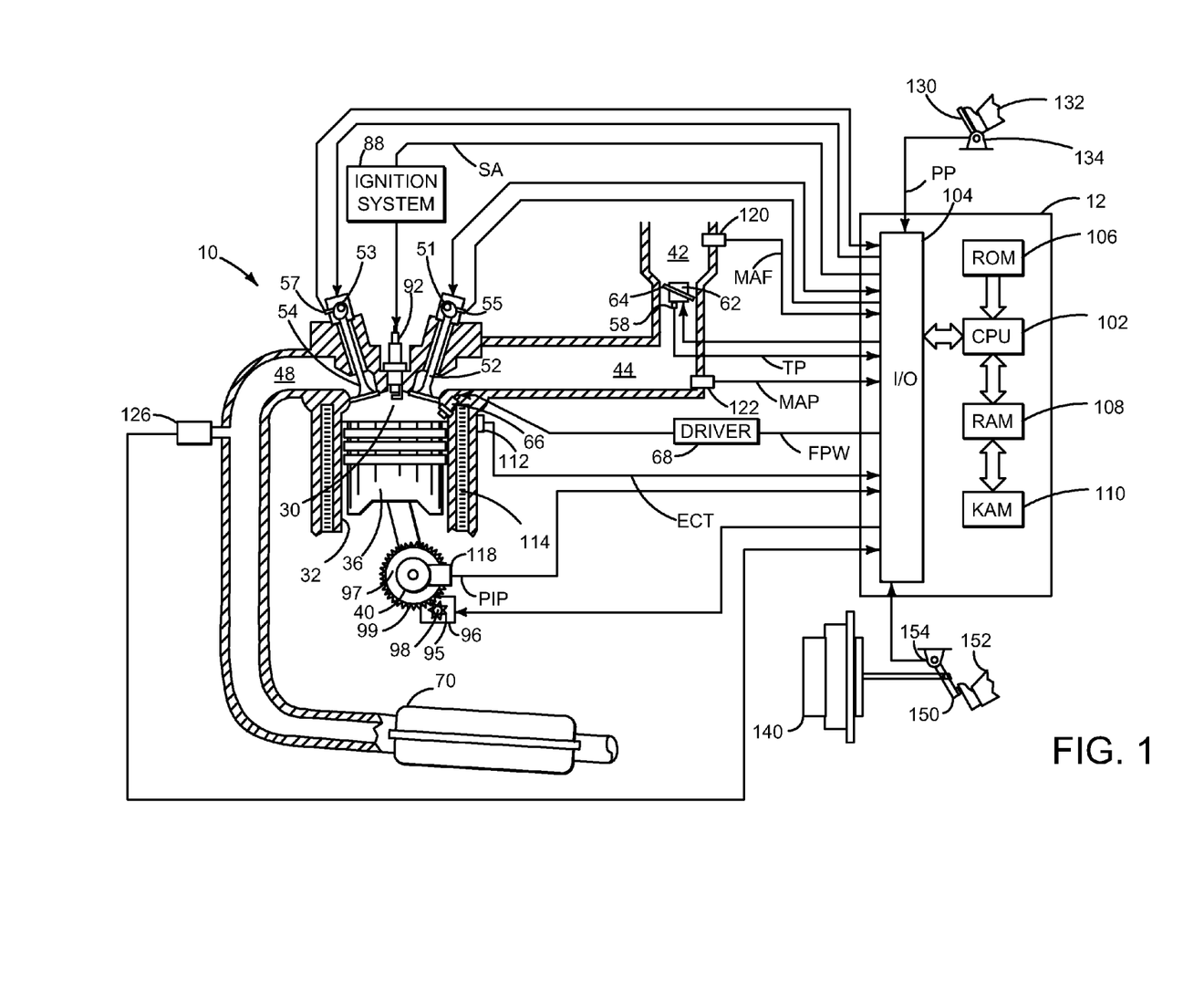
FIG. 1 is a schematic diagram of an engine.
Figure 2:
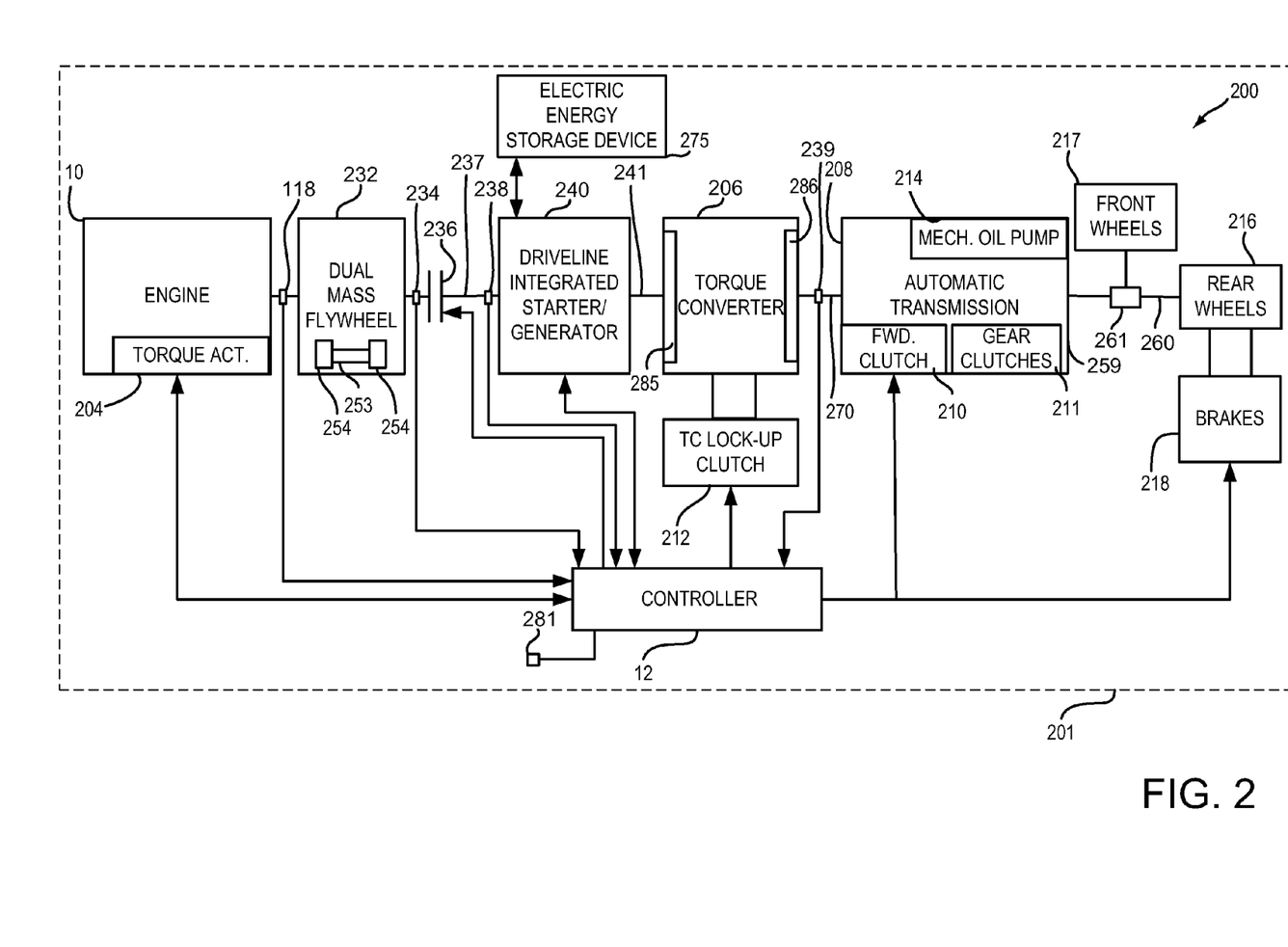
FIG. 2 shows an example driveline configuration for a hybrid electric vehicle.

Methods and systems are provided for enabling smooth engine restarts in a hybrid electric vehicle, such as the vehicle system of FIGS. 1-2. During conditions when an engine restart operation occurs responsive to or during a heavy tip-in, engine speed may be controlled at a time of run-up based on accelerator pedal position. A vehicle controller may be configured to perform a control routine, such as the example routine of FIG. 3, to crank the engine using motor torque while modulating the torque capacity of a disconnect clutch coupled between the engine and the motor. After resuming engine fueling, the vehicle controller may control the engine speed profile so as to raise the engine speed to a target synchronous speed with a profile based on the accelerator pedal position. The engine speed may be controlled via adjustments to engine parameters such as throttle angle and spark timing so that high engine torque delivery can be achieved following engagement of a disconnect clutch. An example engine restart sequence is shown at FIG. 4. In this way, a smooth engine restart is achieved.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes or regenerative braking via a driveline integrated starter/generator (DISG) may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with an engine starting system shown in FIG. 1 or via a driveline integrated starter/generator DISG 240. Further, engine 10 may generate or adjust torque via torque actuator 204, such as a fuel injector, throttle, etc.

An engine output torque may be transmitted to an input side of dual mass flywheel (DMF) 232. Engine speed as well as dual mass flywheel input side position and speed may be determined via engine position sensor 118. Dual mass flywheel 232 may include springs 253 and separate masses 254 for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

When disconnect clutch 236 is fully engaged (or closed), the engine output shaft is coupled to the DISG, allowing the engine torque to be transmitted to the driveline. In contrast, when disconnect clutch 236 is fully disengaged (or open), the engine may be disconnected from the electric machine. Disconnecting the engine from the electric machine allows the electric machine to propel the vehicle without having to overcome parasitic engine losses. Further still, the disconnect clutch may be partially engaged and slipped to vary the disconnect clutch's torque capacity. As elaborated at FIG. 3, controller 12 may be configured to adjust the amount of torque transmitted to crank the engine by adjusting the disconnect clutch 236 during an engine restart. In particular, the disconnect clutch capacity may be modulated by varying the clutch application pressure. In alternate example, the clutch capacity may be modulated by varying the clutch slippage. The clutch may then be closed when the engine speed reaches a synchronous speed that is based on a current or predicted transmission input shaft speed.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is controlled by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits input torque to automatic transmission 208 via fluid transfer between the torque converter turbine 286 and torque converter impeller 285, thereby enabling torque multiplication. In contrast, when torque converter lock-up clutch 212 is fully engaged, the impeller torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 206 by adjusting the torque converter lock-up clutch 212 in response to various powertrain operating conditions, or based on a driver-based powertrain operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 also receives driving surface grade input information from inclinometer 281.

When idle-stop conditions are met, when the vehicle speed is close to zero, or other engine shutdown conditions are met, such as when the engine is shutdown at higher speeds (e.g. during electric only or brake regeneration operation), controller 12 may initiate engine shutdown by shutting off fuel and spark to the engine.

Thus, in the vehicle system of FIGS. 1-2, the vehicle is equipped with a modular hybrid transmission (MHT). As described above, the powertrain has a conventional step ratio automatic transmission in which a "front module", with the electric machine (the DISG) and the disconnect clutch, is inserted between the engine and the transmission input. The DISG is thereby permanently connected to the transmission input (e.g., to the torque converter impeller or to a launch clutch). The disconnect clutch is then used to connect or disconnect the engine, thereby making electric only drive possible.

As such, engine starts are accomplished by controlling the disconnect clutch to vary torque provided from the electric machine to crank the engine. When the engine is rotated a sufficient number of crank angle degrees, fuel and spark is then applied to accelerate the engine crankshaft, and/or flywheel, to the synchronous, or output, speed of the disconnect clutch. As the output side of the disconnect clutch is rigidly connected to the transmission input through the electric machine rotor, the disconnect clutch output is equal to the transmission input speed. To reduce drive line disturbance during the engine restart event, as described below, a controller may reduce disconnect clutch torque capacity or maintain it at a level when significant clutch slip allows the engine to run up to the synchronous speed. At that point the disconnect clutch can be fully applied or engaged without noticeable torque disturbance.

As such, while the engine is being restarted, the motor is used not only to crank the engine but also to propel the vehicle and meet the operator torque demand until the engine is coupled into the driveline. If the engine restart is responsive to an operator tip-in where the operator is requesting acceleration to launch the vehicle from a stationary state, there may be a delay in restarting the engine and providing the requested acceleration. In addition, there may not be sufficient engine torque and airflow to provide the requested acceleration as soon as the engine is coupled into the driveline.

Figure 3:
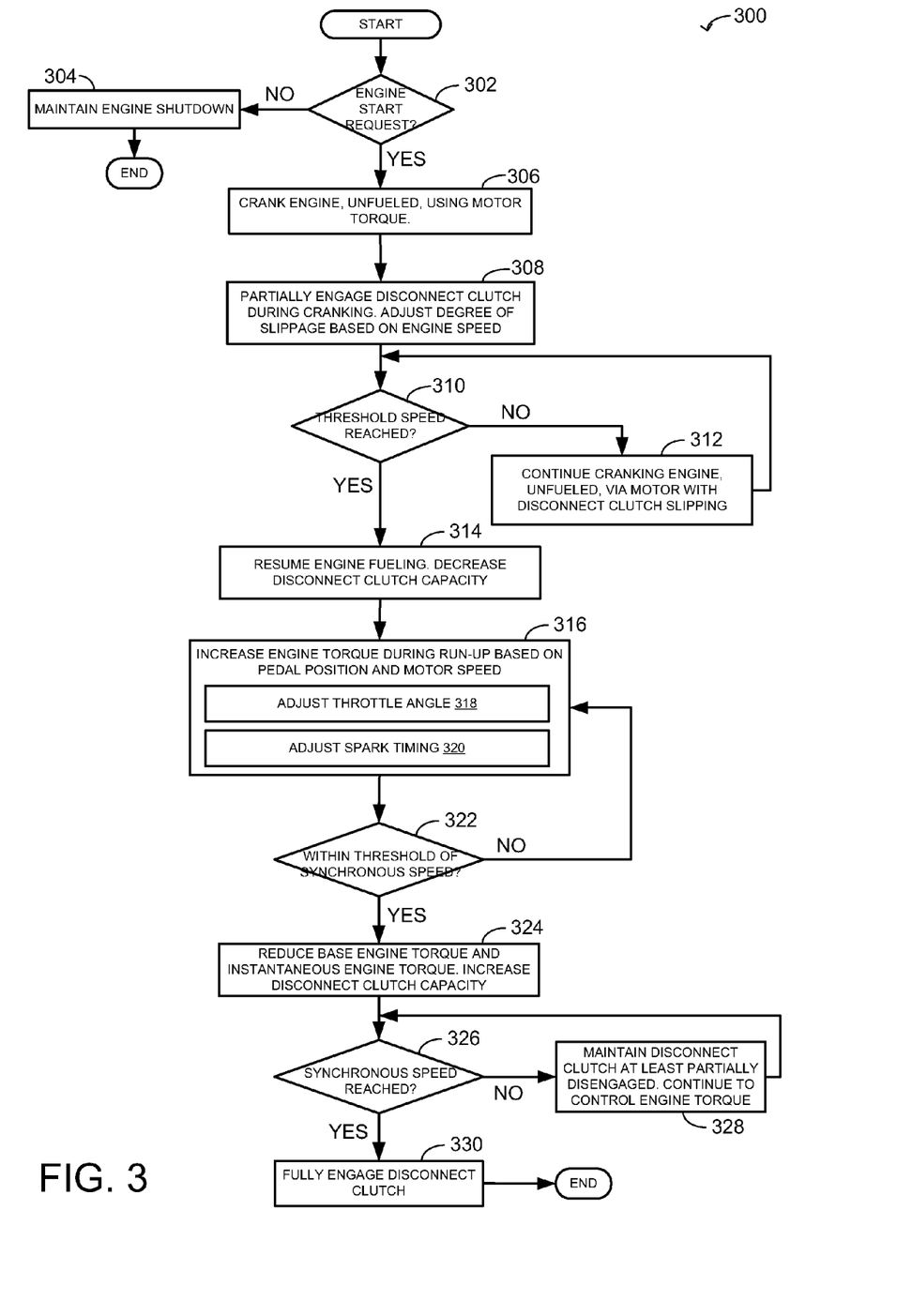
Figure 4:
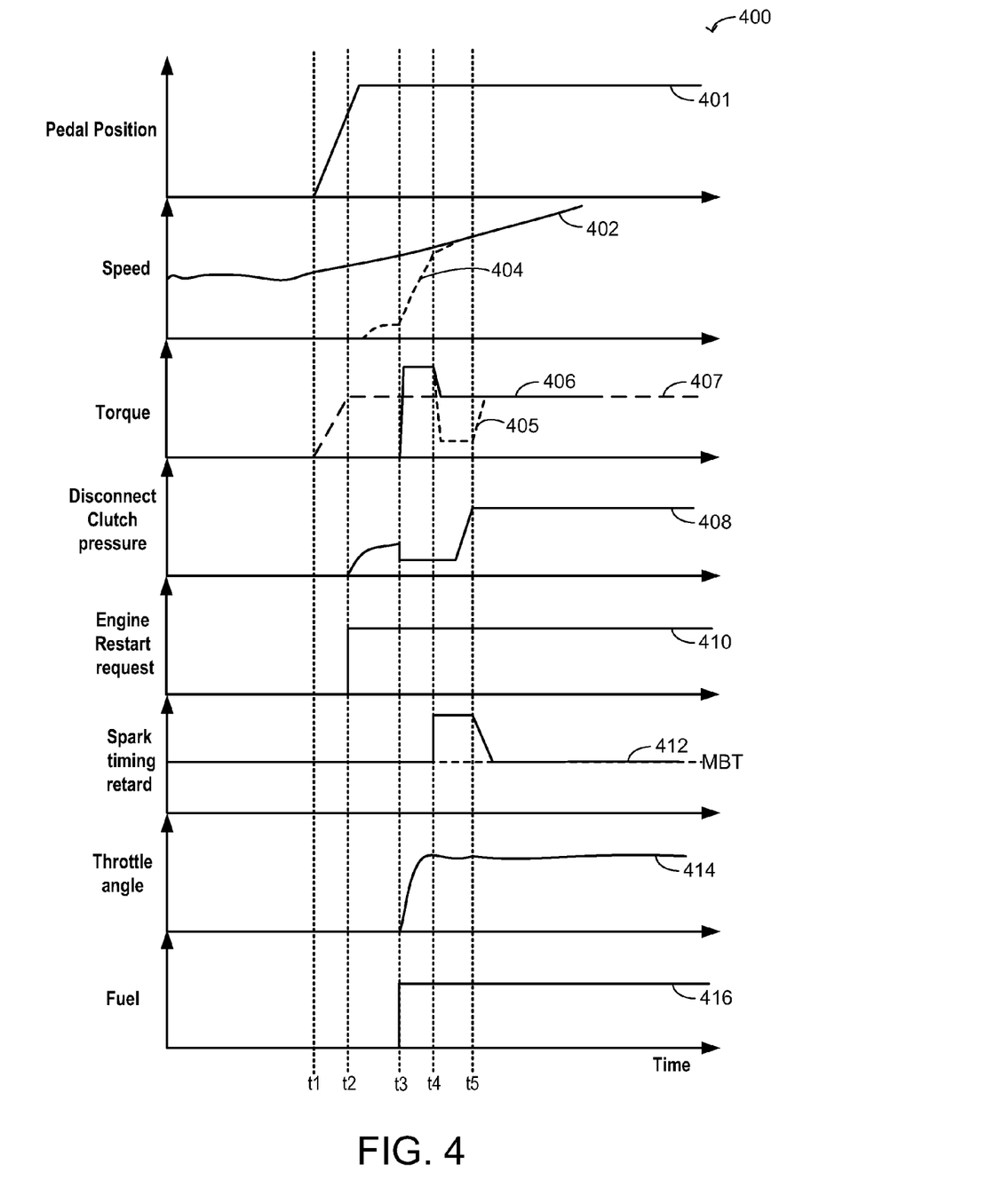
FIG. 4 shows an example engine restart sequence according to the present disclosure.

As elaborated herein, with reference to the methods of FIG. 3, a controller may smoothly restart an engine and launch a hybrid vehicle using the system of FIGS. 1-2. Therein, during an engine restart, the controller may at least partially engage a driveline disconnect clutch to start an engine and adjust engine torque after a first combustion event in response to each of accelerator pedal position and speed of a motor. In particular, the controller may increase the engine torque over the driver torque demand (based on the accelerator pedal position) after resuming cylinder combustion to provide sufficient torque to accelerate the engine to a synchronous motor speed where the disconnect clutch is closed as well as to raise the airflow to a level where engine torque can provide the requested acceleration after the disconnect clutch is closed. In this way, an engine can be started quickly and smoothly from a stationary state to propel the vehicle.

Now turning to FIG. 3, an example method 300 is provided for quickly and smoothly starting an engine. In the present example, the engine is restarted while the vehicle is stationary to launch the vehicle based on a user's demand for increased acceleration.

At 302, the routine includes confirming that an engine restart request has been received. The engine may be coupled to a hybrid vehicle and the engine restart may be requested responsive to an increased torque demand from a vehicle operator to launch the vehicle. For example, the restart request may be due to a heavy accelerator pedal tip-in by the vehicle operator. As another example, an engine restart may be requested responsive to a system battery state of charge being lower than a threshold. At the time of the engine restart, the engine may be stopped and the electric motor may be stopped or spinning. If an engine restart request is confirmed, routine 300 proceeds to 306. Otherwise, the routine proceeds to 304 where the engine is maintained shut down while the vehicle is continued to be operated via motor torque. In one example, where the restart request was received while the vehicle was stationary, the vehicle may be maintained in the stationary state.

At 306, in response to the engine restart request, the routine includes cranking the engine via a motor. In particular, the engine is cranked from rest (that is, 0 rpm). In one example, the engine may be cranked using motor torque from the DISG. In an alternate example, the engine may be cranked using at least some motor torque from a starter motor. The engine may be cranked using motor torque with a disconnect clutch coupled between the engine and the motor at least partially open at 308 so that the motor torque can be transferred to crank the engine. The controller may transiently increase motor speed to provide sufficient torque to crank the engine and meet operator torque demand until the engine is coupled into the driveline. The controller may partially close the disconnect clutch while the engine is cranked, unfueled, via the motor so as to command a specific amount of clutch capacity at the disconnect clutch. While partially engaged, the clutch plates of the disconnect clutch may be slipping, a degree of slippage adjusted based on the engine speed relative to the motor speed. In particular, the clutch may be slipped less when the engine speed is further from the motor speed, and the clutch slippage may be increased as the engine speed rises. Alternatively, the clutch pressure may be adjusted to provide the commanded amount of clutch capacity. The disconnect clutch torque capacity may be adjusted to represent the torque required to crank the engine.

As discussed above, to ensure uninterrupted wheel torque delivery, the motor torque command may be transiently raised in order to crank the engine and driver the wheels simultaneously according to equation (1):

$$\tau_{mtr} = \tau_{dd} - \tau_{dc}, \tag{1}$$

wherein $\tau_{mtr}$ is the motor torque command, $\tau_{dd}$ is the driver demand at the transmission input shaft, and $\tau_{dc}$ is the disconnect clutch torque. As such, the disconnect clutch torque is negative when the torque is from the motor to the engine and positive if the torque is from the engine to the driveline.

Thus, during a first phase of the engine restart, while the engine speed is raised to a first speed, the controller may increase a clutch pressure (or decrease slippage of the clutch) to crank the engine, unfueled, via motor torque.

At 310, it may be determined if the engine has been cranked to a threshold speed. In one example, the threshold speed is a speed above which engine fueling and spark can be resumed and engine torque can be used to spin up the engine. If the engine has not been cranked to the threshold speed, at 312, the routine may continue spinning the engine via the motor with the disconnect clutch partially open.

After the engine speed has reached the threshold speed, at 314, the controller may resume fueling the engine. In addition, the controller may reduce the pressure or capacity of the disconnect clutch while fueling the engine. In particular, during a second phase of the engine restart, following the first phase, while engine speed is raised from the first speed to within a threshold of a target synchronous motor speed, the controller may reduce the capacity of the disconnect clutch based on the engine speed relative to the motor speed. In one example, the engine may be cranked to first speed, such as to 150-200 rpm, unfueled, using motor torque with the disconnect clutch coupled between the engine and the motor at least partially disengaged. When the engine cranking speed reaches a threshold speed, such as at or above 150-200 rpm, engine fueling is resumed and the disconnect clutch capacity is reduced. Reducing the clutch pressure or capacity may include reducing the clutch application pressure. Optionally, a clutch slippage may also be increased.

At 316, the routine includes adjusting an engine torque after a first combustion event in the engine based on each of the accelerator pedal position and a motor speed. In particular, the engine torque may be increased corresponding to the accelerator pedal position and an engine torque required to spin the engine to the speed of the motor. Adjusting the engine torque may include adjusting an intake throttle angle at 318 and/or adjusting spark timing at 320. For example, throttle angle may be increased while spark timing is held at MBT to increase engine torque. In an alternate example, throttle angle may be increased while spark timing is retarded from MBT to increase engine torque.

Adjusting the engine torque may include adjusting each of a base engine torque and an instantaneous engine torque. For example, the base engine torque may be adjusted based on the accelerator pedal position (and thereby the driver torque demand) while the instantaneous engine torque is adjusted based on the speed of the motor and a torque capacity of the disconnect clutch. As an example, as the driver torque demand increases, the base engine torque may be increased to exceed the driver torque demand. At the same time, the instantaneous engine torque may also be increased as the clutch capacity of the disconnect clutch increases.

As such, once combustion starts, the engine starts to produce torque and runs up towards the motor speed using its own torque and the assisting torque from the motor. The disconnect clutch capacity is used at this time to throttle the torque that goes into the engine crankshaft. At higher clutch capacity, the engine gets more assisting torque from the motor and accelerates faster. However, as the maximal torque available from the motor is limited, the portion required to satisfy the driver demand reduces as the disconnect clutch capacity increases. At this point, the engine acts as a torque producing device and the engine torque can be used for a faster engine start. In this phase, the engine torque is commanded as a function of the accelerator pedal position input and the motor speed, up to the maximal torque the engine can realize under the current engine speed at the time, as per equation (2):

$$\tau_{eng} = f_1(x_{apdl}, n_{mtr}),  \quad (2)$$

wherein $x_{apdl}$ is the percentage pedal input, and $n_{mtr}$ is the motor speed. In one example, the engine torque control function may be implemented as a calibratable look-up table. The motor speed may be one of a current motor speed and a predicted motor speed. In one example, where the motor speed is a current motor speed, the motor speed may be based on a current gear of the driveline transmission. In another example, where the motor speed is a predicted motor speed, the predicted motor speed may correspond to a speed of the motor at a time of disconnect clutch engagement. Alternatively, the predicted motor speed may be based on a predicted gear of the driveline transmission at the time of disconnect clutch engagement.

As such, the engine torque command may be made up of a base torque command which dictates the airflow into the engine, and an instantaneous torque command which translates into spark and fuel controls for instantaneous realization of the torque. In one example, during the second phase, to control the engine torque the controller may increase the base engine torque to exceed a torque demand based on the accelerator pedal position and further increase the instantaneous engine torque based on engine speed relative to motor speed. For example, the base engine torque and the instantaneous engine torque commands may be substantially equal to each other during the second phase of the engine restart.

By increasing the engine torque during the second phase, while engine speed is run-up towards the target synchronous motor speed, excessive engine torque can be used to accelerate the engine to the target motor speed and in addition, prepare the engine air path for torque delivery after the engine connects to the driveline. In particular, for turbocharged engines, high engine torque cannot develop until the turbocharger spools up. Herein, by commanding high engine torque during the run-up, a higher engine air flow may be established such that by the time the engine connects into the driveline, the intake manifold pressure is already at a higher level.

At 322, it may be determined if the engine speed is within a threshold of the target synchronous motor speed. For example, it can be determined if the engine has accelerated to a calibratable speed below the motor speed. If not, the routine may return to 316 to controllably command engine torque so as to raise the engine speed towards the target motor speed. When the engine speed is within (and below) a threshold of the target synchronous motor speed, the routine may enter a third phase, following the second phase, of the engine restart. Therein, at 324, the routine include decreasing the engine torque to slow down engine acceleration to the target synchronous motor speed. In other words, engine torque is increased at a first, higher rate (with a steeper slope) when raising engine speed from the first speed (where engine fueling was resumed) to within a threshold of the target speed, and thereafter engine torque is decreased when raising engine speed from within the threshold of the target speed to the target speed. In addition to decreasing engine torque, the controller may decrease slippage of the disconnect clutch so as to fully close the disconnect clutch by the time the engine speed has reached the target speed. As an example, the controller may decrease the base engine torque to a level that meets the driver torque demand and provides no additional torque over the driver torque demand.

At the same time, the controller may further decrease the instantaneous engine torque to a level below the disconnect clutch capacity.

As such, during the entirety of the second phase of the engine restart, the engine speed is lower than the motor speed and the disconnect clutch transmits torque from the motor to the engine. In comparison, during the third phase, the driveline is coordinated for the engine to connect. Thus, in the third phase, the disconnect clutch torque undergoes a reversal in its direction when the engine speed and motor speeds are synchronized and the disconnect clutch is closed. Equation (1) still applies when commanding the motor torque. Thus, during the third phase, the engine base torque command is first pulled down to the driver demand with some charging torque $\tau_{chrg}$. The engine instantaneous torque command is then reduced to some calibratable amount below the disconnect clutch capacity, according to equation (3):

$$\tau_{eng\_base} = \tau_{dd} + \tau_{chrg}$$

$$\tau_{eng\_inst} = |\tau_{dc}| + \tau_{cal1}$$

$$\tau_{cal1} = f_2(x_{apdl}, n_{mtr}) > 0 \quad (3)$$

By controlling the engine torque to maintain the instantaneous engine torque below the disconnect clutch capacity, the controller may better ensure that the engine continues to accelerate under reduced torque without overshooting the motor speed. By better matching the engine speed to the motor speed, driveline disturbances and NVH issues caused by speed differences at the time of disconnect clutch closing are reduced and a smoother engine restart is enabled. As such, the disconnect clutch naturally arrests and holds the engine once the two speeds (engine speed and motor speed) are synchronized. Once the engine and the motor are in synchronization, the disconnect clutch is commanded to ramp its capacity to lock the engine to the driveline and the engine starts to deliver torque to the driveline as per equation (4):

$$\tau_{dc\_cap} > \tau_{eng\_base} + \tau_{cal2}$$

$$\tau_{cal2} > 0$$

$$\tau_{eng\_inst} = f_3(\tau_{eng_{base}}), \quad (4)$$

where $f_3(\tau_{eng_{base}})$ is a ramp function which ramps $\tau_{eng\_inst}$ to $\tau_{eng_{base}}$ with some given rate.

In one example, engine fuel, spark and/or airflow may be adjusted to provide engine torque that enables a desired engine speed profile to the target synchronous speed to be provided. In some examples, the engine torque may be further adjusted based on a derivative of the current engine speed after resuming engine fueling (indicative of the engine speed trajectory) and a derivative of the current motor speed after resuming engine fueling (indicative of the motor speed trajectory). This allows the engine torque to be more accurately adjusted responsive to the predicted synchronous motor speed. In particular, based on the engine speed trajectory and the motor speed trajectory, engine torque may be adjusted so that the engine speed better matches the synchronous motor speed at the desired time of disconnect clutch engagement. For example, fuel and/or air may be transiently increased and spark timing may be retarded to increase engine acceleration when the engine speed is ramped to within the threshold of the target synchronous speed. Herein, by increasing fueling and/or retarding spark timing, a difference between the engine speed and the motor speed is reduced. As another example, fuel and/or air may be transiently decreased and spark timing may be advanced to decrease engine acceleration when the engine speed is ramped from within the threshold of the target synchronous speed to the target speed.

As such, when the engine speed is below the synchronous speed, the engine may be spinning with the disconnect clutch at least partially open. That is, while the engine speed is adjusted to the synchronous speed, the disconnect clutch may be maintained partially disengaged with a degree of slippage of the partially disengaged or partially open disconnect clutch continually adjusted based on the engine speed relative to the synchronous speed. For example, when the difference between the engine speed and the synchronous speed is higher, the degree of slippage may be increased, and as the engine speed approaches the synchronous speed, the degree of slippage may be decreased. Alternatively, the clutch pressure may be adjusted while the clutch slip is maintained.

For example, during the first phase of the engine restart, while the engine speed is raised to the first speed, the controller may increase clutch capacity (or decrease slippage) of the disconnect clutch to crank the engine, unfueled, via motor torque. Then, during a second phase following the first phase, while engine speed is raised from the first speed to within a threshold of the target synchronous speed, the controller may decrease clutch capacity (or increase slippage) of the clutch based on engine speed relative to motor speed. Further, during a third phase following the second phase, after engine speed is within the threshold of the target synchronous speed, the controller may increase clutch capacity (or decrease slippage) of the clutch to fully close the clutch.

In this way, the engine speed profile or trajectory to the target speed may also be controlled. For example, engine speed may be initially be raised from the first speed (when engine fueling is resumed) to a second speed (which is below the target speed, but within a threshold of the second speed), based on the accelerator pedal position to provide more torque than demanded. The engine torque may be provided herein at a faster rate by increasing engine fueling at a higher rate, opening the throttle angle more, and/or retarding spark timing by a larger amount. This allows the engine to be quickly accelerated to a second speed that is within a threshold of the target speed. In addition, the engine airflow is raised to a level that allows for rapid engine torque delivery after connection of the engine into the driveline. Then, once the engine speed is at the second speed and within a threshold of the target speed, engine speed may be raised at a slower rate from the second speed to the target synchronous speed, such as by increasing engine fueling at a lower rate, decreasing the throttle angle, and/or advancing spark timing. This allows the engine to be gradually, and more deliberately, moved to the target speed without undershooting or overshooting the target speed. As such, this may improve the accuracy of matching the engine speed to the synchronous speed, thereby improving engine restart quality.

In some examples, the controller may also use engine speed feedback to control the engine restart speed profile. In particular, since the slip speed is closely related to the engine speed profile, by controlling the slip speed profile (or a disconnect clutch torque capacity profile), a desired engine torque profile to the target synchronous speed may be achieved. The clutch slip may be related to the engine speed/torque profile in that slip is equal to the disconnect clutch input speed (neglecting any DMF oscillation) minus the disconnect clutch output speed. Thus, the DISG speed may be used as the input speed and slip may be adjusted to achieve a desired engine speed profile (e.g., desired rate of increase in engine speed) to the target speed.

At 326, it may be determined if the synchronous speed has been reached. If not, at 328, the controller may continue to adjust engine torque by adjusting engine fueling, throttle angle and/or spark timing to bring the engine speed to the synchronous speed while the disconnect clutch is maintained at least partially disengaged. In addition, clutch slippage may be continually adjusted based on the engine speed relative to the motor speed (or target synchronous speed).

If the engine speed is at or above the target synchronous speed, then at 330, the routine includes closing the disconnect clutch. After closing the disconnect clutch, the hybrid vehicle may be propelled with at least engine torque. For example, the hybrid vehicle may be transitioned from an electric mode to a hybrid mode. After closing the disconnect clutch, engine torque may be increased again based on the accelerator pedal position and driver torque demand.

In one example, during an engine restart, a hybrid vehicle controller may crank an engine using motor torque with a disconnect clutch coupled between the engine and a motor at least partially open; and while the engine speed is raised towards a target synchronous motor speed, modulate the capacity of the disconnect clutch (such as by modulating clutch slippage); and adjust an engine torque based on each of an accelerator pedal position and a motor speed. Herein, cranking the engine using motor torque includes increasing motor torque based on the accelerator pedal position and engine speed to crank the engine, unfueled, to a first speed, and then crank the engine, fueled, to the target synchronous motor speed. The controller may fully close the disconnect clutch when the engine speed matches the target synchronous motor speed, and subsequently propel the vehicle using a combination of engine torque and motor torque.

Modulating the capacity of the disconnect clutch may include, during a first phase, while the engine speed is raised to the first speed, commanding higher capacity of the clutch to crank the engine, unfueled, via motor torque; during a second phase following the first phase, while engine speed is raised from the first speed to within a threshold of the target synchronous speed, commanding lower capacity of the clutch based on engine speed relative to motor speed; and during a third phase following the second phase, after engine speed is within the threshold of the target synchronous motor speed, increasing the capacity of the clutch to fully close the clutch. In one example, the higher capacity of the clutch is commanded by increasing clutch pressure, while the lower capacity of the clutch is commanded by decreasing clutch pressure. In another example, the higher capacity of the clutch is commanded by decreasing clutch slippage Likewise, adjusting the engine torque based on each of an accelerator pedal position and a motor speed includes, during the second phase, increasing a base engine torque to exceed torque demand based on the accelerator pedal position, and further increasing instantaneous engine torque based on engine speed relative to motor speed; and during the third phase, decreasing the base engine torque to a level that meets torque demand based on the accelerator pedal position while further decreasing instantaneous engine torque based on disconnect clutch capacity. Increasing the base torque includes increasing a throttle opening, while decreasing the base torque includes decreasing the throttle opening.

In this way, an engine restart may be enabled while providing sufficient engine torque and airflow to allow a driver demanded acceleration to be met as soon as the engine is coupled into the driveline. This allows for a smoother and faster vehicle launch. In addition, driveline torque disturbances are reduced.

Now turning to FIG. 4, an example restart sequence is depicted. In particular, map 400 of FIG. 4 depicts an engine restart to launch a stationary hybrid vehicle. Map 400 depicts an accelerator pedal position at plot 401, a motor speed (or transmission input shaft speed) at plot 402 (solid line) relative to an engine speed at plot 404 (dashed line), an engine torque including an instantaneous engine torque at plot 405 and a base engine torque at plot 406, a disconnect clutch pressure at plot 408, an engine restart command at plot 410, spark timing adjustments at plot 412, throttle opening adjustments at plot 414, and engine fueling at plot 416. All plots are represented over time (increasing along the x-axis from the left side to the right side of each plot).

Prior to t1, the hybrid vehicle may be operating in an electric mode with the vehicle being operated using motor torque. In the depicted example, the vehicle may be stationary but operational just before to t1. Between t1 and t2, the operator may heavily tip-in the accelerator pedal to increase vehicle acceleration and launch the vehicle. The change in operator pedal position may be responsive to a torque demand for vehicle acceleration that may not be sufficiently met by only the motor torque and additional engine torque may be required. Thus, at t2, an engine restart command may be delivered and an engine restart event may be initiated.

A first phase of the engine restart may occur between t2 and t3. Therein, in response to the engine restart command, between t2 and t3, the engine may be cranked via the motor. Motor torque may be transiently increased between t2 and t3 to provide sufficient motor torque to crank the engine and drive vehicle wheels simultaneously (that is, meet the operator torque demand). Before t2, the disconnect clutch may be fully open or held at a minimum degree of engagement, such as at a stroke pressure. During the first phase, between t2 and t3, the disconnect clutch may be transiently closed or partially engaged (as indicated by the transient increase in clutch pressure) so as to enable the motor torque to be used to bump up the engine speed to a first speed wherefrom combustion can be initiated. As such, the disconnect clutch may have been held open or at a stroke pressure prior to the engine restart. The pressure of the disconnect clutch is adjusted (e.g., increased) during the first phase so that the clutch capacity of the disconnect clutch represents the torque required to crank the engine.

At t3, once the engine has been sufficiently cranked to a first speed by the motor, engine fueling and spark are resumed and cylinder combustion is initiated. Once engine combustion starts, the first phase of the engine restart is completed and the second phase is entered. The second phase then occurs between t3 and t4. Therein, engine combustion torque and assisting torque from the motor is used to spin up the engine towards the motor speed. While the engine is combusting, the disconnect clutch capacity is reduced to a level that needs to assist the engine acceleration. This allows the motor torque to be used to drive the vehicle wheels while the engine is spun up.

In response to engine fueling, engine torque output may start to increase. The engine torque is then controlled while the engine speed is being ramped up but is still below the target synchronous motor speed, the torque adjusted based on each of the accelerator pedal position and the motor speed. In particular, the engine torque is commanded initially to a high value to overcome engine inertia, accelerate the engine toward the engine target speed (as indicated by the engine speed plot between t3 and t4 having a steeper slope), and increase engine airflow. A throttle opening is increased (e.g., the throttle is opened on every event) while spark is held at MBT so as to generate excessive torque for engine acceleration (that is more than required to meet driver torque demand 407 (dashed line) by increasing both base engine torque and instantaneous engine torque). The excessive engine torque accelerates the engine to the motor speed while preparing the engine air path for increased torque delivery after the engine connects to the driveline by increasing the intake manifold pressure and allowing higher engine intake airflow to be established by the time the engine connects into the driveline. In addition, torque delivery is improved even if a turbocharger has not spooled up by the time the engine is connected into the driveline.

At t4, the engine speed may be within a threshold of the target synchronous motor speed. Thus, at t4, a third phase of the engine restart may be initiated. In the third phase, the driveline is prepared for the engine to connect. In this phase, the disconnect clutch torque will reverse its direction when the engine speed and motor speed synchronize and the disconnect clutch is locked. At t4, the engine torque is decreased (as indicated by the engine speed plot after t4 having a shallower slope). In particular, the engine base torque command is reduced to the driver demand (possibly with some charging torque) while the instantaneous torque command is reduced to some calibratable amount below the disconnect clutch torque capacity by increasing spark retard from MBT. By reducing the engine torque below the clutch torque capacity, the engine speed is allowed to accelerate more deliberately (at a rate slower than the rate of acceleration before t4) to the motor speed, reducing the likelihood of engine speed overshooting the motor speed. The disconnect clutch is maintained partially disengaged with the clutch slipping while the engine speed is brought to the synchronous motor speed.

By t5, the engine may attain the synchronous speed of the motor. Consequently, between t4 and t5, the disconnect clutch pressure is increased so that the clutch can be closed after t5. The disconnect clutch capacity is increased, and slippage is decreased, as a difference between the engine speed and the synchronous motor speed decreases between t4 and t5. After t5, engine torque is increased and used to propel the vehicle and provide the desired acceleration.

It will be appreciated that while the example of FIG. 4 shows the accelerator pedal position change prior to the restart, in still other examples, the accelerator pedal position may be further changed during the restart. For example, in response to the accelerator pedal being depressed and a further tip-in event occurring after t3, while the engine is run-up, the engine torque may be further increased above the torque demand. In addition, the clutch capacity may be further reduced so that more torque can be made available to the vehicle wheels via the motor. As such, this is traded off with a slower engine start.

As an example, a hybrid vehicle system may comprise an engine; an electric motor; a disconnect clutch coupled in a driveline between the engine and the motor; an accelerator pedal for receiving a driver torque demand; and vehicle wheels coupled to the driveline downstream of the motor. The vehicle system may further include a controller with computer readable instructions configured on non-transitory memory for: in response to an accelerator pedal tip-in, increasing motor torque to meet the driver torque demand and crank the engine unfueled to a first speed with the disconnect clutch partially engaged. Then, after engine speed is at the first speed, the controller may fuel the engine, and increase engine torque to exceed the driver torque demand and raise engine speed to within a threshold of a target synchronous motor speed. Finally, when engine speed is within the threshold of the target synchronous motor speed, the controller may decrease engine torque below driver torque demand while.

The controller may include further instructions for: after the engine speed matches the target synchronous motor speed, fully engaging the disconnect clutch, and increasing engine torque to meet the driver torque demand. Further, in response to an increase in driver torque demand after engine speed is at the first speed, the controller may be configured to further increase engine torque while further decreasing clutch capacity.

The technical effect of adjusting engine torque and disconnect clutch capacity during an engine restart after engine fueling is resumed is that a faster engine restart and vehicle launch may be enabled in a hybrid electric vehicle. By adjusting an engine torque during an engine restart speed run-up responsive to an operator's accelerator pedal tip-in, engine airflow and intake manifold pressure can be rapidly raised by the time the engine is used to propel the vehicle. By increasing the engine torque during an initial phase of the engine speed run-up, the engine speed can be brought closer to a target synchronous speed faster. By subsequently lowering the engine torque, the engine speed may be matched to the target synchronous speed more accurately and reliably, reducing driveline disturbances and related NVH issues. By concurrently modulating a disconnect clutch's torque capacity, motor torque can be used to propel the vehicle while the engine speed is brought up to the motor speed. By expediting the engine restart and a transition out of the electric mode, a desired engine acceleration can be provided to launch the vehicle as soon as the spinning engine is coupled into the driveline. Overall, a smoother and faster engine restart is enabled.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for starting an engine, comprising:
closing a driveline disconnect clutch to start the engine; and
adjusting a torque of the engine after a first combustion event in response to each of an accelerator pedal position and a speed of a motor,
wherein the driveline disconnect clutch is coupled in a driveline between the engine and the motor, and where closing the driveline disconnect clutch includes:
partially closing the driveline disconnect clutch while cranking the engine, unfueled, via the motor;
then, reducing a clutch capacity of the driveline disconnect clutch while fueling the engine and adjusting the engine torque; and
when a speed of the engine is at or above a target synchronous motor speed, fully closing the driveline disconnect clutch.

2. The method of claim 1, wherein the engine is coupled to a hybrid vehicle, and wherein the engine start is an engine start from a vehicle stationary state to launch the vehicle.

3. The method of claim 1, further comprising, transiently increasing a motor torque to crank the engine, unfueled, and providing an operator demanded torque, the operator demanded torque based on the accelerator pedal position.

4. The method of claim 3, wherein the target synchronous motor speed includes one of a current motor speed and a predicted motor speed.

5. The method of claim 3, wherein adjusting the engine torque further includes, when the engine speed is within a threshold of the target synchronous motor speed, decreasing the engine torque until the engine speed is at the target synchronous motor speed, and then increasing the engine torque after fully closing the driveline disconnect clutch.

6. The method of claim 1, wherein adjusting the engine torque after the first combustion event includes increasing the engine torque based on each of the accelerator pedal position and a torque required to spin the engine to a speed within a threshold of the target synchronous motor speed.

7. The method of claim 6, wherein the target synchronous motor speed is a predicted motor speed, the predicted motor speed based on a predicted gear of a driveline transmission at a time of driveline disconnect clutch engagement.

8. The method of claim 1, wherein adjusting the engine torque includes adjusting one or more of a spark timing, a throttle angle, and a fuel injection, and wherein adjusting the engine torque further includes adjusting the engine torque only after the first combustion event of the engine, the first combustion event of the engine occurring in response to each of the accelerator pedal position and the speed of the motor.

9. The method of claim 1, wherein the motor is an electric motor.

10. A method for a hybrid vehicle, comprising:
during a restart of an engine,
cranking the engine using a torque of a motor while a disconnect clutch coupled between the engine and the motor is at least partially open; and
while a speed of the engine is raised towards a target synchronous motor speed,
modulating a clutch capacity of the disconnect clutch; and
adjusting a torque of the engine based on each of an accelerator pedal position and a speed of the motor,
wherein cranking the engine using the motor torque includes increasing the motor torque based on the accelerator pedal position and the engine speed to crank the engine, unfueled, to a first speed, and then crank the engine, fueled, to a speed within a threshold of the target synchronous motor speed, fully closing the disconnect clutch when the engine speed matches the target synchronous motor speed, and subsequently propelling the vehicle using a combination of the engine torque and the motor torque, and
wherein modulating the clutch capacity of the disconnect clutch includes
during a first phase, while the engine speed is raised to the first speed, increasing the clutch capacity of the disconnect clutch to crank the engine, unfueled, via the motor torque;
during a second phase following the first phase, while the engine speed is raised from the first speed to the speed within the threshold of the target synchronous motor speed, decreasing the clutch capacity of the disconnect clutch based on the engine speed relative to the motor speed; and
during a third phase following the second phase, and after the engine speed is within the threshold of the target synchronous motor speed, increasing the clutch capacity of the disconnect clutch to fully close the disconnect clutch.

11. The method of claim 10, wherein the restart of the engine is initiated in response to a tip-in of an accelerator pedal.

12. The method of claim 10, wherein the restart of the engine is initiated in response to a battery state of charge being lower than a threshold.

13. The method of claim 10, wherein the motor is an electric motor.

14. The method of claim 13, wherein the motor is stopped when the restart of the engine is initiated.

15. The method of claim 13, wherein the motor is spinning when the restart of the engine is initiated.

16. A hybrid vehicle system, comprising:
an engine;
an electric motor;
a disconnect clutch coupled in a driveline between the engine and the motor;
an accelerator pedal for receiving a driver torque demand;
vehicle wheels coupled to the driveline downstream of the motor; and
a controller with computer readable instructions configured on non-transitory memory for:
in response to an accelerator pedal tip-in,
increasing a motor torque of the electric motor to meet the driver torque demand and to crank the engine unfueled to a first speed with the disconnect clutch partially engaged;
after a speed of the engine is at the first speed, fueling the engine while decreasing a clutch capacity, and increasing a torque of the engine to exceed the driver torque demand and raise the engine speed to be within a threshold of a target synchronous motor speed; and when the engine speed is within the threshold of the target synchronous motor speed, decreasing the engine torque below the disconnect clutch capacity.

17. The system of claim 16, wherein the controller includes further instructions for:

after decreasing the engine torque below the disconnect clutch capacity and responsive to the engine speed matching the target synchronous motor speed, fully engaging the disconnect clutch, and increasing the engine torque to meet the driver torque demand and a battery charging torque.

18. The system of claim 17, wherein in response to an increase in driver torque demand after the engine speed is at the first speed, the controller is configured to further increase the engine torque while decreasing the disconnect clutch capacity.

19. The system of claim 18, wherein the controller includes further instructions for, after fully engaging the disconnect clutch, propelling a vehicle using a combination of the engine torque and the motor torque.

* * * * *